US012553605B2

(12) United States Patent
Takmaz (10) Patent No.: US 12,553,605 B2
(45) Date of Patent: Feb. 17, 2026

(54) MERCURY, DIOXIN, AND FURAN REMOVAL SYSTEM AND METHOD FOR REDUCING GAC FIRES ON NEW HIGH TEMPERATURE MUNICIPAL SLUDGE INCINERATORS

(71) Applicant: Levent Takmaz, Glen Allen, VA (US)

(72) Inventor: Levent Takmaz, Glen Allen, VA (US)

( * ) Notice: Subject to any disclaimer, the term of this patent is extended or adjusted under 35 U.S.C. 154(b) by 644 days.

(21) Appl. No.: 18/072,810

(22) Filed: Dec. 1, 2022

(65) Prior Publication Data

US 2024/0183529 A1 Jun. 6, 2024

Related U.S. Application Data

(60) Provisional application No. 63/301,069, filed on Jan. 20, 2022.

(51) Int. Cl.
| F23J 15/00 | (2006.01) |
| C02F 11/12 | (2019.01) |
| F23J 15/02 | (2006.01) |
| F23J 15/04 | (2006.01) |
| F23J 15/06 | (2006.01) |
| F23J 15/08 | (2006.01) |

(52) U.S. Cl.
CPC ............ *F23J 15/006* (2013.01); *C02F 11/12* (2013.01); *F23J 15/025* (2013.01); *F23J 15/027* (2013.01); *F23J 15/04* (2013.01); *F23J 15/06* (2013.01); *F23J 15/08* (2013.01)

(58) Field of Classification Search
CPC ........ F23J 15/006; F23J 15/025; F23J 15/027; F23J 15/04; F23J 15/06; F23J 15/08; F23J 2219/30; C02F 11/12
See application file for complete search history.

(56) References Cited

U.S. PATENT DOCUMENTS

| 6,355,904 | B1* | 3/2002 | Batdorf | G21F 9/308 |
| | | | | 219/121.36 |
| 8,197,565 | B2 | 6/2012 | Rokhvarger et al. | |
| 10,843,130 | B2 | 11/2020 | Sjostrom et al. | |
| 11,065,578 | B2 | 7/2021 | Sjostrom et al. | |
| 11,118,127 | B2 | 9/2021 | Senior et al. | |
| 2003/0065236 | A1* | 4/2003 | Vosteen | F23J 15/04 |
| | | | | 422/184.1 |
| 2004/0024279 | A1* | 2/2004 | Mason | F23G 5/0276 |
| | | | | 588/317 |
| 2004/0200393 | A1* | 10/2004 | Zauderer | C01B 3/02 |
| | | | | 110/345 |
| 2008/0156236 | A1* | 7/2008 | Ito | F23C 6/047 |
| | | | | 110/263 |
| 2017/0107478 | A1* | 4/2017 | Harmon | F23J 15/02 |

(Continued)

*Primary Examiner* — David J Laux
(74) *Attorney, Agent, or Firm* — James R. McDaniel (57) ABSTRACT

The present invention is generally related to a system and method that efficiently and effectively removes mercury, dioxin, and furan while also reducing granule activated carbon ("GAC") bed fires on high temperature municipal fluid bed sludge incinerators. In this manner, the United States Environmental Protection Agency (EPA) Maximum Achievable Control Technology LLLL ("MACT LLLL") emission limits on mercury, dioxin, and furans can be met for new high temperature fluid bed municipal sludge incineration plants, while the likelihood of GAC fires can be reduced.

20 Claims, 7 Drawing Sheets

(56) References Cited

U.S. PATENT DOCUMENTS

| | | | |
|---|---|---|---|
| 2017/0198908 A1* | 7/2017 | Zhang | B01D 53/504 |
| 2018/0161726 A1* | 6/2018 | Gadgil | F23J 7/00 |
| 2019/0118138 A1 | 4/2019 | Strickroth | |
| 2020/0141570 A1* | 5/2020 | Ström | B01J 8/1809 |
| 2024/0183529 A1* | 6/2024 | Takmaz | C02F 11/12 |

* cited by examiner

MERCURY, DIOXIN, AND FURAN REMOVAL SYSTEM AND METHOD FOR REDUCING GAC FIRES ON NEW HIGH TEMPERATURE MUNICIPAL SLUDGE INCINERATORS

CROSS-REFERENCE TO RELATED APPLICATION

This application is a continuation-in-part of U.S. Patent Application 63/301,069, filed on Jan. 20, 2022, the disclosure of which is hereby incorporated by reference in its entirety to provide continuity of disclosure to the extent such a disclosure is not inconsistent with the disclosure herein.

FIELD OF THE INVENTION

The present invention is generally related to a system and method that efficiently and effectively removes mercury, dioxin, and furan while also reducing granule activated carbon ("GAC") bed fires on high temperature municipal fluid bed sludge incinerators. In this manner, the United States Environmental Protection Agency (EPA) Maximum Achievable Control Technology LLLL ("MACT LLLL") emission limits on mercury, dioxin, and furans can be met for new high temperature, fluid bed municipal sludge incineration plants, while the likelihood of GAC fires can be reduced.

BACKGROUND OF THE INVENTION

Prior to the present invention, as set forth in general terms above and more specifically below, it is known, that equipment suppliers have been supplying sulfur impregnated activated carbon beds to remove mercury, dioxin and furans from flue gas discharged by high temperature fluid bed sludge incinerators. Historically, mercury emission limits have been very high in terms of not requiring any carbon beds to meet the EPA emission limits on mercury, dioxin, and furans.

In March 2011, the US EPA released the new MACT LLLL emissions limits for new municipal fluid bed sludge incinerators having only 1 micron per dry standard cubic meter of mercury emission limits in the stack (corrected to 7% $O_2$). In particular, all existing and new fluid bed incinerators in the U.S. need to meet the new emission limits. Furthermore, existing incinerators were mandated to be completely shut down if they cannot meet the new emission limits by March 2016. Emission limits for mercury are 1 micron per standard dry cubic meter of flue gas corrected to 7% oxygen in the stack for new incinerators and 37 microns per standard dry cubic meter of flue gas corrected to 7% oxygen in the stack for existing incinerators. Currently, GAC (Granule Activated Carbon) technology is the only available technology in the US to meet mercury, dioxin, and furan emission limits in the stack for new incinerators based on the recent stack emission test results from three new incineration plants presented in Tables 1 and 2. Currently, SPC (Sorbent Polymer Composite) technology is the only available technology to meet 37 microns mercury emission limits in the stack based on the recent stack emission test results from two existing incineration plants presented below in Table 3.

To address these new emission limits, equipment suppliers have added more sulfur impregnated activated carbon into the carbon bed adsorbers to remove more mercury, dioxin, and furan from the flue gas in order to meet the new MACT LLLL emission limits on mercury, dioxin and furans.

However, it has been discovered that adding more activated carbon resulted in significant temperature excursions in carbon beds which have resulted in unexpected carbon bed fires at new incineration plants. Removing mercury from flue gas using sulfur impregnated activated carbon is an exothermic process releasing heat which results in higher-than-expected carbon bed temperatures. In particular, existing incineration plants were retrofitted with sorbent polymer composite ("SPC") technology in order to meet the 37-micron mercury emission limit. However, the SPC technology cannot remove dioxin and furan from flue gas and cannot be used on new incineration plants as part of the air pollution control system. Furthermore, SPC technology can only be used on existing installations due to the higher mercury emission limit (37 micron) compared to the new incineration plant mercury emission limit (1 micron). It should be noted that SPC installations never had any problems with fires and have historically been very safe to operate. Dioxin and furan emissions from existing incineration plants are meeting the MACT MMMM emission limits without dioxin and furan removal. Mercury removal using SPC technology is not an exothermic process which, will not result in temperature increase of the SPC modules.

This invention eliminates the temperature excursions resulting in carbon bed fires by removing 70% to 90% of mercury in the flue gas through the use of a sorbent polymer composite material. Secondly, the remaining mercury removal will be accomplished by installing an improved adsorber having a smaller carbon bed that utilizes a smaller amount of sulfur impregnated activated carbon, thereby reducing the risk of temperature excursions and carbon bed fires. Thirdly, most of the mercury will be removed within the sorbent polymer composite modules. Fourthly, the remaining mercury in the flue gas will be removed by a smaller sulfur impregnated activated carbon bed in the improved adsorber. Finally, the combined design of the present invention will also meet the current allowable dioxin and furan emission levels in the stack for new incinerators.

It is a purpose of this invention to fulfill these and other needs in the high temperature, fluid bed, municipal sludge incineration plant art in a manner more apparent to the skilled artisan once given the following disclosure.

The preferred high temperature municipal sludge incinerator, according to various embodiments of the present invention, offers the following advantages: the ability to remove mercury, dioxin, and furan; the ability to reduce temperature excursions and granule activated carbon bed ("GAC") fires; the use of sorbent polymer composite material to assist in eliminating the temperature excursions and GAC fires; the use of an improved adsorber having smaller carbon bed that includes a smaller amount of activated carbon to also assist in reducing the risk of temperature excursions and fires due to decreased level of exothermic reactions; the use of sorbent polymer composite material to assist in removing the mercury; and the use of a sulfur impregnated activated carbon bed to further assist in removing the mercury. In fact, in many of the preferred embodiments, these advantages are optimized to an extent that is considerably higher than heretofore achieved in prior, known high temperature municipal sludge incinerators.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which:

FIGS. 2-A and 2-B are schematic illustrations of different embodiments of a high temperature, fluid bed, municipal sludge incineration system, constructed according to the present invention;

FIGS. 3-A and 3-B are schematic illustrations of different embodiments of an absorber, constructed according to the present invention;

DETAILED DESCRIPTION OF THE PREFERRED EMBODIMENTS OF THE INVENTION

In order to address the shortcomings of the prior, known, high temperature, fluid bed, municipal sludge incineration systems, it would be desirable to provide a high temperature, fluid bed, municipal sludge incineration system that efficiently and effectively removes mercury, dioxin, and furan while also reducing the likelihood of granule activated carbon ("GAC") bed fires which would prove to be a significant advancement over the current high temperature, fluid bed, municipal sludge incineration systems.

Existing High Temperature, Fluid Bed, Municipal Sludge Incineration System

Figure 1:
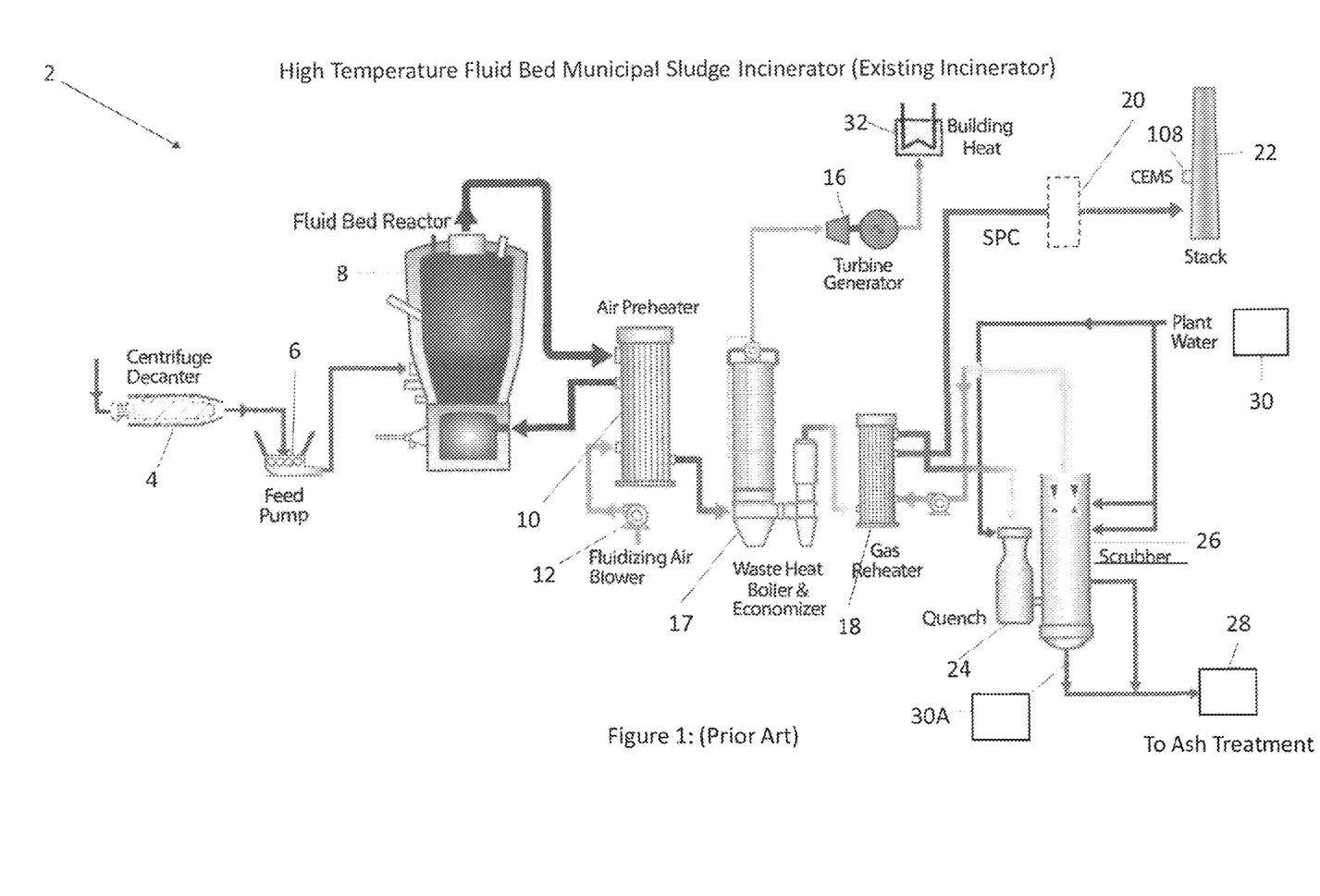
FIG. 1 is a schematic illustration of an existing high temperature, fluid bed, municipal sludge incineration system, constructed according to the prior art.

Reference is made now to FIG. 1, where there are illustrated an existing high temperature, fluid bed, municipal sludge incineration system 2, constructed according to the prior art. In particular, high temperature, fluid bed, municipal sludge incineration system 2 includes, in part, centrifuge decanter 4, feed pump 6, fluid bed reactor 8, air preheater 10, fluidizing air blower 12, turbine generator 16, waste heat boiler and economizer 17, gas reheater 18 (optional), sorbent polymer composite module (SPC) 20, exhaust stack 22, quencher 24, scrubber 26, ash treater 28, plant water supply 30, head of plant supply 30A, building heat supply 32, and continuous emissions monitoring system (CEMS) 108.

During the operation of high temperature, fluid bed, municipal sludge incineration system 2, municipal sludge is dewatered by the centrifuge decanter 4. Preferably, the dewatered sludge has a dry solids content of 25-27%. The dewatered sludge is then conveyed to the fluid bed reactor 8 by the feed pump 6.

While in the fluid bed reactor 8, the dewatered sludge is subjected to a temperature of at least 1250° F. in the sand bed and combustion products are subjected to a temperature of approximately 1550° F. in the freeboard for approximately 6-7 seconds. During this heating process, the dewatered sludge is quickly heated to a volatilization temperature to provide a complete combustion of the volatile chemicals contained in the dewatered sludge and to produce a flue gas. The flue gas exits from the fluid bed reactor 8 at a temperature of approximately 1550° F. The flue gas also contains ash and other inorganic matter and water vapor.

The flue gas is transported to the air preheater 10. In the air preheater 10, the hot, dirty flue gas passes through the air preheater 10. Air from fluidizing air blower outlet at approximately 150° F. is introduced into the air preheater 10 by the fluidizing air blower 12. The air from the fluidizing air blower 12 interacts with the flue gas to decrease the temperature at which the flue gas exits the air preheater 10 to approximately 1,000° F. The air is then heated to 1,200° F. in the air preheater 10. The reason air is heated to 1200° F. is so that the air can have an autogenous (self-generated) combustion inside the reactor 8, which means "zero" auxiliary fuel consumption (fuel oil or natural gas) while burning sludge.

After the flue gas exits the air preheater 10, the flue gas enters the waste heat boiler and economizer 17. While in the waste heat boiler and economizer 17, the flue gas comes into contact with the boiler tubes (not shown) in the waste heat boiler and economizer 17. Some ash contained within the flue gas is removed from the flue gas and is collected in hoppers (not shown). Finally, the flue gas exits the waste heat boiler and economizer 17 at approximately a temperature of 450° F.

Some of the waste flue gas recovered from the waste heat boiler and economizer 17 is used to heat a conventional water stream, which creates superheated steam. The steam is sent to the turbine generator 16 to create green electricity which could be used to provide a building heat supply 32 for the building during winter months in which the high temperature, fluid bed, municipal sludge incineration system 2 is located. During summer months, the steam is used to generate power to operate the plant.

The remainder of the waste flue gas is then transported to gas reheater 18 (optional). In gas reheater 18, clean flue gas is introduced into gas reheater 18 at approximately 95° F. to 100° F. (100% relative humidity, fully saturated). The clean flue gas interacts with the waste flue gas thereby reducing the temperature of the waste flue gas to a level lower than 450° F. depending on the required clean flue gas outlet temperature. It is to be understood that gas reheater 18 is an optional equipment. Some of the existing plants do not have the gas reheater 18 and still meet the mercury emission limit in the stack because there is a minimum amount of mercury in the sludge. A lower mercury removal efficiency without a gas reheater 18 is acceptable if the plant meets the stack emission limit on mercury during the stack emission testing. Gas reheater 18 is used to increase the gas temperature above dew point thereby preventing condensation inside the SPC vessel and resulting in higher mercury removal efficiency. Gas reheater 18 could have the flue gas, electricity, or steam as the hot source depending on the preference of the plant. Typically, for SPC modules, gas temperature is increased about 1° F. to 3° F. above the inlet gas temperature by using gas reheater 18. SO$_2$ emissions in the stack 22 are maintained below 15 ppm by using either the natural alkalinity of water or by adding a caustic solution (30% or 50%) to the scrubber water. SPC modules also captures SO$_2$ from the flue gas, which could transform to sulfuric acid (H$_2$SO$_4$). To prevent the corrosion of the SPC vessel (stainless steel), SO$_2$ emissions are maintained below 15 ppm on existing incinerators in order to be in compliance with US EPA MACT MMMM emission limits.

The waste flue gas/clean flue gas mixture is then transported to the quencher 24 and scrubber 26. While in the quencher 24 and scrubber 26, the temperature of the waste flue gas is reduced by using liquid (water from plant water supply 30), particulates such as cadmium (Cd) and lead (Pb) including the heavy metals are removed, and acid gas is removed including sulfur dioxides (SO$_2$) and hydrogen chloride (HCl). In particular, the waste flue gas is quenched to its saturation point in order to substantially eliminate the bulk of the particulates in the waste flue gas. Finally, liquid water from plant water supply 30 is atomized into fine droplets which then are used to collect more fine particulates in the waste flue gas on top of the scrubber tray cooler inside the venturi section (not shown). If the scrubber water alkalinity is not low enough to meet the 15 ppm SO$_2$ emission limit at the scrubber outlet (MACT MMMM emission limit), a caustic solution (30% or 50%) is added to the scrubber water. However, typically, existing plants meet the 15 ppm SO$_2$ emissions without adding caustic.

It is to be understood that scrubber 26 typically has two separate units, each with a separate function. The first unit is a pre-cooler quencher 24, in which the waste flue gas is accelerated, and where water is introduced. Some of the ash and sand particles from the fluid bed reactor 8 are hit by the water droplets and wetted by them so that they are separated together with the water in the chamber below the quench section. Ash slurry at 1-2% consistency flows through the cross over duct to scrubber cooling tower (or tray cooler) and then is removed from the bottom of cooling tower through ash pumps (not shown in FIG. 1).

The second section of the wet scrubber 26 is a cooling tower which includes a multiple venturi "section" installed on top of tray cooler in which the waste flue gas is brought into intimate contact with a large quantity of cooling water. The waste flue gas passes through several specially designed perforated plates that are kept flooded with water. The waste flue gas from the cooling tower then moves to the multiple venturi section, where the waste flue gas is sprayed with a large quantity of cooling water to remove remaining fine particulates from the waste flue gas.

Finally, the scrubber 26 has two separate water outlets, namely the ash slurry and the cooling tray water. Ash slurry is sent over to ash treatment 28 (i.e., ash lagoons). Ash slurry from the scrubber 26 is conveyed by the ash slurry pumps (not shown) (2 pumps, 1 operating, 1 stand-by). The ash pump's speed will vary depending on the scrubber tray cooler sump water level (faster for high scrubber tray cooler sump levels and slower for low scrubber tray cooler sump levels). Tray water discharge is sent to the head of plant supply 30A. At some installations, tray water is also sent to ash treatment through ash pumps.

The waste flue gas is also transported back from the quencher 24 and scrubber 26 to the gas reheater 18 (optional). The waste flue gas from the gas reheater 18 is then transported to the sorbent polymer composite (SPC) module 20. If there is no gas reheater 18 installed after the waste heat boiler, the waste flue gas from the scrubber is sent directly to the sorbent polymer composite (SPC). In SPC module 20, mercury in the waste flue gas is removed, but not the dioxin and furan from waste flue gas. It has been determined that the SPC module 20 can only meet the 37 microns mercury emission limit in stack 22 per US EPA MACT MMMM emission limits. During the removal of mercury from flue gas, there is no heat released inside of the modules. It is to be understood that the process is not exothermic process.

Finally, the waste flue gas from SPC module 20 is then transported to the stack 22 and the waste flue gas is monitored for oxygen (O$_2$), carbon monoxide (CO), and nitrogen oxides (NO$_x$) by continuous emissions monitoring system (CEMS) 108. What remains of the waste flue gas is exhausted into the atmosphere through stack 22. The existing incineration system is tested once a year by an independent stack emission testing company. Results of the stack emission testing are sent to a local EPA office to show the compliance with US EPA MACT MMMM emission limits.

New High Temperature, Fluid Bed, Municipal Sludge Incineration System

Figure 2:
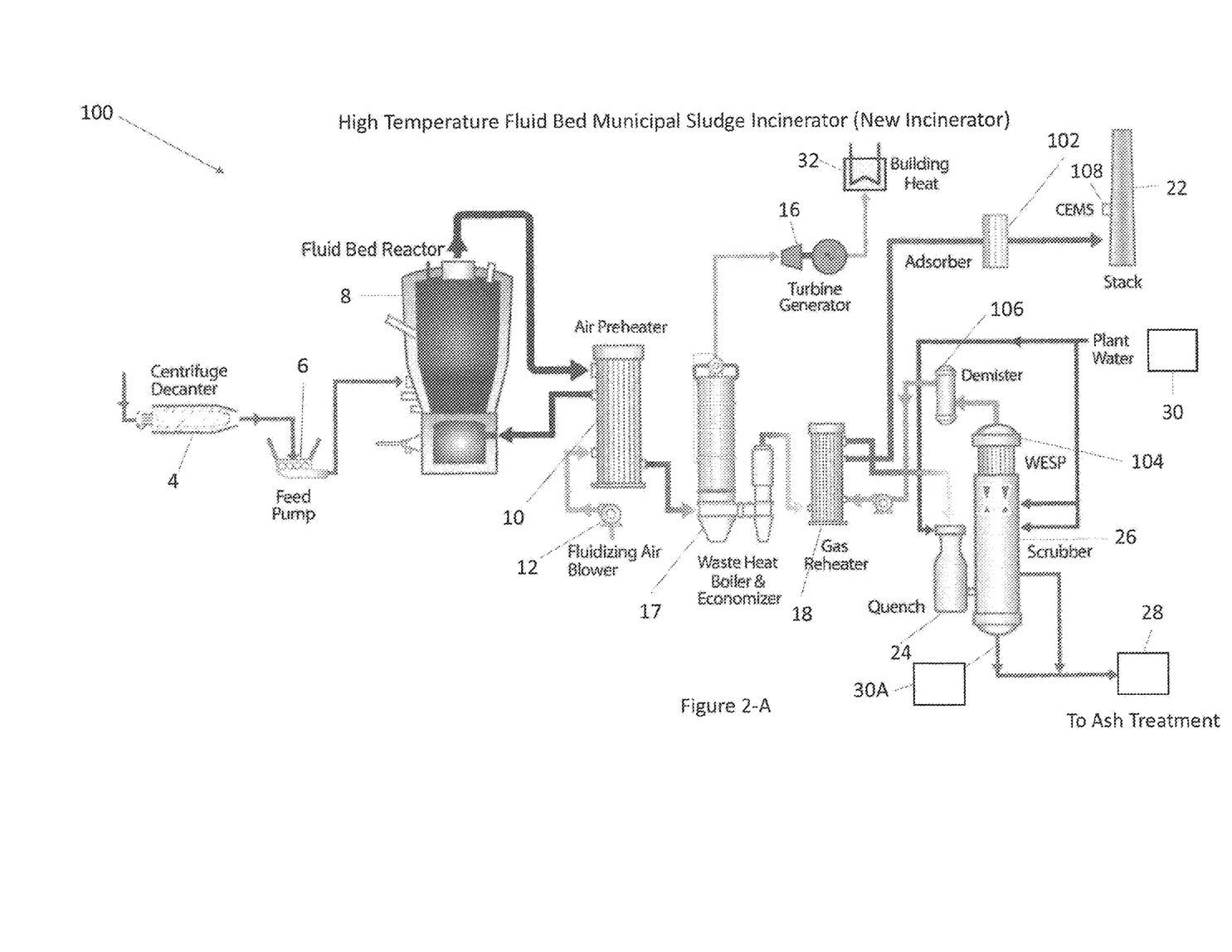

To address the issues encountered with the prior, known, high temperature municipal sludge incinerators, attention is directed to FIGS. 2-A and 2B. As shown in FIG. 2-A, high temperature, fluid bed, municipal sludge incineration system 100 includes, in part, centrifuge decanter 4, feed pump 6, fluid bed reactor 8, air preheater 10, fluidizing air blower 12, turbine generator 16, waste heat boiler and economizer 17, gas reheater 18, adsorber 102, exhaust stack 22, quencher 24, scrubber 26, wet electrostatic precipitator 104, demister 106, continuous emissions monitoring system (CEMS) 108, ash treater 28, plant water supply 30, head of plant supply 30A, and building heat supply 32.

It is to be understood that the high temperature, fluid bed, municipal sludge incineration system 100A (FIG. 2-B) includes almost all of the same elements as the high temperature, fluid bed, municipal sludge incineration system 100 (FIG. 2-A). However, in the high temperature, fluid bed, municipal sludge incineration system 100A, a HEPA filter 110 and a fine particulate filter 112 have been added, as will be discussed in greater detail later.

Currently, there are only three new high temperature, fluid bed, municipal sludge incineration plants operating in the US; (1) Mattabassett Plant—one incinerator (Cromwell, CT); (2) Green Bay Plant (Currently named as New Water Plant) —one incinerator (Green Bay, WI), and (3) Hazleton Plant—one incinerator (Hazleton, PA). All three plants have passed the stack emission testing and are in compliance with the US EPA MACT LLLL emission limits. However, both of the New Water and Mattabassett Plants have experienced temperature excursions resulting in carbon bed fires.

FIG. 2-B shows a new incineration system having slightly different air pollution control system. This new design includes a demister 106, HEPA filter 110 (FIG. 2-B), and carbon bed adsorber 102. The carbon bed in adsorber 102 had only two activated carbon layers impregnated with sulfur. The first carbon bed layer that was utilized for dust removal has been eliminated from the design due to the installation of HEPA filter 110 upstream of adsorber 102 to remove dust from the flue gas. This new design has not experienced a carbon bed fire. This is due to a modification of the air pollution control system design by using a HEPA filter 110 (FIG. 2B) in lieu of a carbon bed layer for dust removal reducing the amount of carbon inside the adsorber and using an air gap between the carbon beds to improve heat dissipation from the beds. In addition, the vertical gas flow from top to bottom has more uniform flow distribution through the carbon beds including the bottom part of carbon bed where the carbon is more compact due to the weight of carbon sitting on top. The supplier is now recommending a revised air pollution control system design on a new incineration project by replacing the demister with a fine particulate filter 112 (FIG. 2B) to capture free water droplets and dust from the flue gas. However, the new design has never been tested on a new municipal fluid bed sludge incinerator.

It is to be understood that centrifuge decanter 4, feed pump 6, fluid bed reactor 8, air preheater 10, fluidizing air blower 12, turbine generator 16, waste heat boiler and economizer 17, gas reheater 18, exhaust stack 22, quencher 24, scrubber 26, ash treater 28, plant water supply 30, head of plant supply 30A, building heat supply 32, and continuous emissions monitoring system (CEMS) 108 are constructed in substantially the same manner as discussed earlier with respect to high temperature, fluid bed, municipal sludge incineration system 2.

Regarding wet electrostatic precipitator (WESP) 104, wet electrostatic precipitator 104 is located on top of scrubber 26 or installed downstream of scrubber 26 as a standalone unit. In this manner, wet electrostatic precipitator 104 provides additional removal of particulate matter and cadmium and lead from the waste flue gas to be able to meet the US EPA MACT LLLL emission limits on Cd, Pb, and PM.

Once the additional removal of particulate matter and cadmium and lead from the waste flue gas has been completed in the wet electrostatic precipitator 104, the waste flue gas is transported to the demister 106. While in the demister 106, the waste flue gas is demisted to prevent free water droplets from passing through the demister 106. Small water droplets are removed from flue gas inside the demister 106 to prevent the small water droplets from entering the carbon bed in adsorber 102. It is to be understood that if there is a fine particulate filter 112 (FIG. 2-B) installed in lieu of demister 106, free water droplets are captured and removed by the fine particulate filter, however the new design including the fine particulate filter in lieu of demister has never been implemented at a new municipal fluid bed sludge incineration plant.

The waste flue gas from the demister 106 then enters the gas reheater 18 and the waste flue gas is reheated in a similar manner as discussed above. Gas reheater 18 increases the clean waste flue gas temperature about 40° F. to 45° F.

The waste flue gas from the gas reheater 18 is then transported to the adsorber 102. While in the adsorber 102, mercury (elemental and ionic), chlorinated dibenzo-p-dioxins (CDD), and chlorinated dibenzo-p-furans (CDF) are removed.

Finally, the waste flue gas is then transported to the stack 22 and the waste flue gas is monitored for oxygen ($O_2$), carbon monoxide (CO), and nitrogen oxides ($NO_x$) by continuous emissions monitoring system (CEMS) 108. The waste flue gas is then exhausted into the atmosphere through stack 22, as discussed above. In this manner, the emissions from the stack 22 meet the current EPA's most stringent MACT standards for new fluid bed incinerators. The new incineration system is tested once a year by an independent stack emission testing company. Results of stack emission testing are sent to a local EPA office to show the compliance with US EPA MACT LLLL emission limits.

A unique aspect of the present invention is the use of the adsorber 102. In particular, the waste flue gas temperature from the air preheater 18 is increased by 40° F. to 45° F. to prevent condensation inside the carbon bed of the fluid bed reactor 8. Conversely, for the SPC module 20 (FIG. 1), the flue gas temperature is increased by only 1° F. to 3° F. to have slightly over 90% relative humidity (RH) to prevent condensation on the SPC module 20 that would blind the modules, thereby decreasing the mercury removal efficiency of the SPC module 20.

It is to be understood that when the waste flue gas comes out of scrubber 26, it is 100% saturated. For the adsorber 102, the waste flue gas temperature is increased significantly higher compared to the SPC module 20 to lower the relative humidity in order to prevent condensation inside the adsorber 102 that would blind the activated carbon inside the adsorber 102.

More particularly, adsorber 102 is equipped with sulfur impregnated activated carbon. When the waste flue gas comes into the adsorber 102, the sulfur binds with the mercury in the waste flue gas, thereby assisting with the removal of the mercury from waste flue gas. Additionally, dioxin and furans settle on the sulfur impregnated activated carbon in the adsorber 102. Mercury removal using sulfur impregnated activated carbon is an exothermic process releasing heat during mercury removal.

It is to be understood that adsorber 102 should be installed in manner that requires a waste flue gas by-pass and more cold stainless steel flue gas ducting (not shown). When the incinerator is not burning sludge (burning only auxiliary fuel), adsorber 102 is completely by-passed and kept warm by closing the isolation dampers. During cold start up, a conventional heater skid (not shown) is used to warm up the adsorber 102 before sludge burning. Keeping the sulfur impregnated activated carbon warm prevents the condensation inside the adsorber 102 that would blind the carbon pores. This allows the adsorber 102 to effectively and efficiently remove mercury, dioxin, furans from the waste flue gas. In this manner, the adsorber 102 can meet the one (1) micron mercury emission limit in the stack 22 per US EPA MACT LLLL emission limits for fluid bed municipal sludge incinerators.

Conversely, SPC module 20 (FIG. 1) does not remove dioxin and furan from the waste flue gas. The SPC module 20 only removes mercury from the waste flue gas. Furthermore, the SPC module 20 can only meet a 37 microns mercury emission limit in the stack 22 per US EPA MACT MMMM emission limits.

It is important to understand that the EPA released the new LLLL and MMMM emission limits in March 2011. All new and existing fluid bed municipal sludge incinerators had to meet the new limits by March of 2016. There is no need to remove dioxin and furan from the waste flue gas for existing incinerators because US EPA MACT MMMM emission limits on dioxin and furans are easy to meet without removal. However, for new incinerators, dioxin and furans must be removed from the waste flue gas to be able to meet LLLL emission limits on dioxins and furans.

As discussed above, sulfur impregnated activated carbon bed technology is the only available technology to meet mercury, dioxin and furan emissions from new fluid bed incinerators based on the stack emission test data from the new incinerators (Table 1 and 2). However, these activated carbon beds have experienced problems with temperature excursions due to a significant amount of carbon being installed inside the carbon bed adsorber and due to exothermic reaction releasing heat into the carbon bed. An emergency quench water system has been installed on top of carbon beds to dose the carbon beds with water during thermal excursions, carbon monoxide (CO) analyzers were added at the inlet and outlet of adsorber 102 to determine the increase in CO due to fires, and interlocks and alarms were implemented to determine the temperature increase inside the carbon beds through thermocouples installed inside the carbon beds in order to prevent temperature excursions resulting in carbon bed fires. However, it is impossible to discover the localized hot spots using only a few thermocouples. In case there is an increase in CO levels or carbon bed temperatures, emergency quench water system is activated by PLC dosing the carbon bed with water to decrease the carbon temperature. It is to be understood that while the current design can control the carbon bed fires, there is still a risk of fire when the incinerators are being operated.

It is also known the technology exists to remove mercury from waste flue gas. Sorbent polymer composite (SPC) modules are being used to remove mercury from waste flue gas. However, SPC technology cannot remove dioxin and furans from waste flue gas. Furthermore, SPC technology cannot meet the one (1) micron mercury emission limit in stack 22 to be in compliance with US EPA MACT LLLL emission limits for the high temperature fluid bed municipal sludge incinerators.

Another unique aspect of the present invention is that the present invention combines the sulfur impregnated activated carbon bed technology and the SPC technology into one single design. In particular, waste flue gas flows into the adsorber 102 for the removal of mercury from waste flue gas with little or no risk of fires. Also, the waste flue gas flows into an adsorber 102 that utilizes a very small carbon bed for the removal of mercury, dioxin and furan, thereby meeting the US EPA MACT LLLL emission limits for the new incinerators. In one embodiment, carbon beds for new projects have the following sulfur impregnated activated carbon bed weights: Hazleton (4.6 lb/1 ft$^3$ of flue gas); New Water (Green Bay) (4.8 lb/1 ft$^3$ of flue gas); Mattabassett (6.9 lb/1 ft$^3$ of flue gas). Carbon beds on the new projects have been designed to remove at least 98% of mercury from flue gas. In the new design, 70 to 90% of mercury should be removed by SPC modules. Let us assume modules will remove 70% of mercury from flue gas as the worst case scenario. In this instance, the amount of carbon for new design will be as follows: Hazleton (2 lb/1 ft$^3$ of flue gas); New Water (Green Bay) (2.1 lb/1 ft$^3$ of flue gas); Mattabassett (3 lb/1 ft$^3$ of flue gas). In these instances, the amount of carbon used in the adsorber can be reduced by approximately 50%.

As discussed above, the US EPA mandated that all new fluid bed incinerators in the U.S. meet the new emission limits on mercury, dioxin, and furans. The present invention, using the SPC modules combined with an adsorber 102 that utilizes very small carbon beds, meets the new emission limits. Furthermore, smaller carbon beds should not have any problems such as temperature excursions and/or carbon bed fires due to having a lower amount of activated carbon being installed inside the adsorber 102. Mercury removal from flue gas using sulfur impregnated activated carbon is an exothermic process releasing heat inside the carbon bed thereby resulting in unexpected temperature excursions. Therefore, reducing the amount of carbon inside the adsorber 102 will decrease the potential for carbon bed fires.

Figure 3:
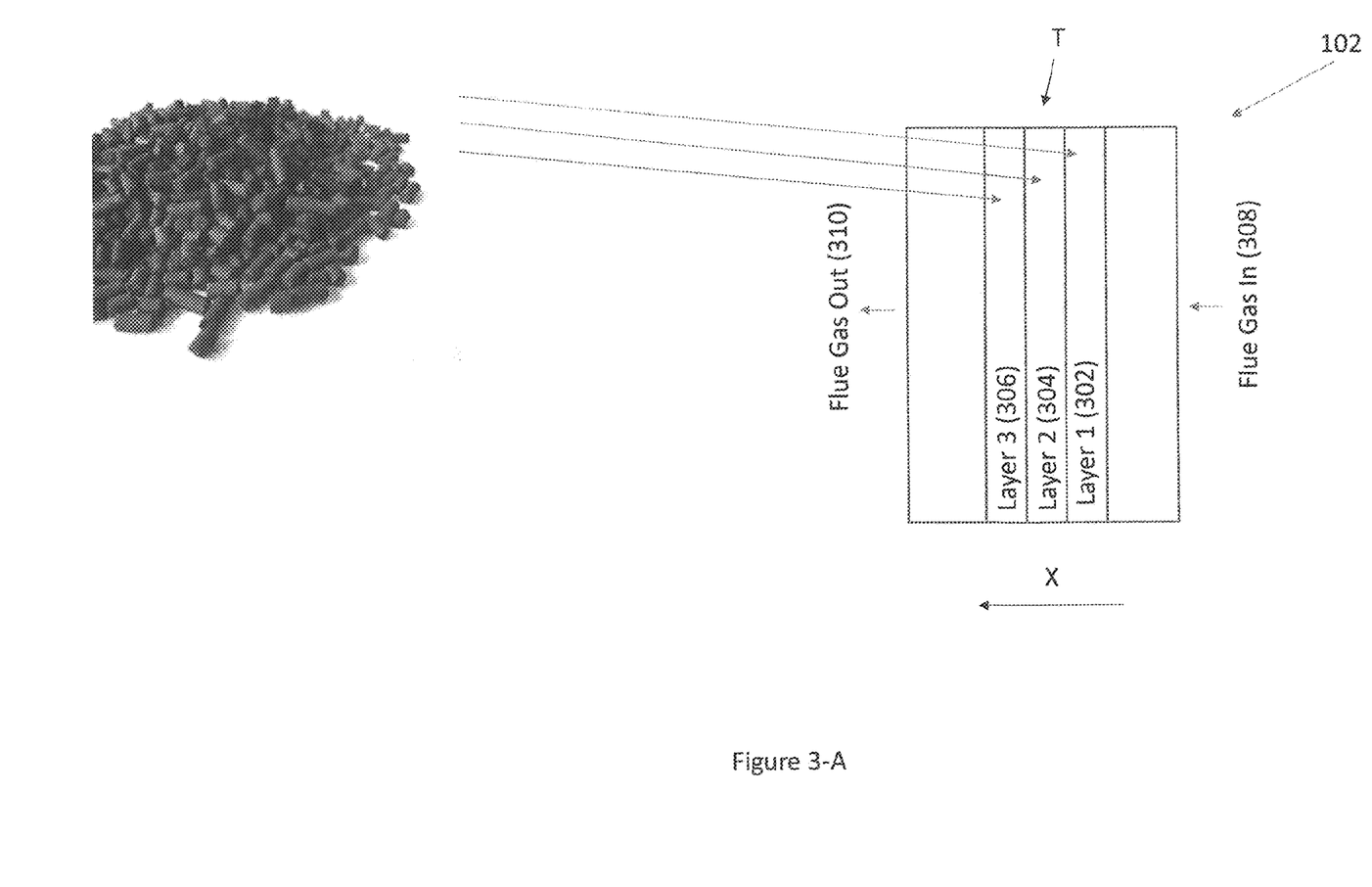

With respect to FIG. 3-A (CPPE Carbon Bed Adsorber), a schematic of adsorber 102 is shown. Adsorber 102 includes, in part, layers 302-306, flue gas inlet 308, and clean flue gas outlet 310. Preferably, layer 302 is filed with only an activated carbon to remove dust from the flue gas. Layers 304 and 306 are filled with sulfur impregnated activated carbon to remove mercury, dioxin, and furan from the flue gas. Typically, the layers 302-306 are contained within cassettes (not shown), the layers 302-306 can be replaced when needed by opening the knife gate valves (not shown) at the bottom of adsorber 102. Super sacks filled with activated carbon or sulfur impregnated activated carbon are used to fill up the layers 302-306 from the top (T) of adsorber 102 by gravity flow. Flue gas flow is horizontal (along the direction of arrow X) inside the adsorber 102.

As shown in FIG. 3-A, the waste flue gas enters the adsorber 102 through flue gas inlet 308. The waste flue gas then flows through layer 302, through layer 304, and through layer 306 in order to interact with layers 302-306, and the "clean" flue gas exits adsorber 102 through clean gas outlet 310. The clean flue gas then is transported to the continuous emissions monitoring system (CEMS) 108 (FIG. 2-A or 2-B). Plants sub-contract a stack emission testing company once a year to conduct a stack emission testing per US EPA MACT LLLL emission requirements. The stack emission testing company measures the mercury, dioxin, and furan emissions. Also, the stack emission company tests other pollutants as well (PM, SO$_2$, CO, NOx, HCl, Cd, Pb, etc.) per MACT LLLL requirements. Results are sent to the local EPA office to show the compliance of incinerator with MACT LLLL emission limits. Amount of carbon bed material used for this design is between 4.8 and 6.9 lb/1 ft3 of flue gas at the inlet. It is to be understood that while this is not the desired design to use with the new incinerator design due to being horizontal gas flow design, due to the lower amount of sulfur impregnated activated carbon, this design should provide acceptable results.

One concern with this design is that the lower portions of the layers are compacted due to the weight of the material in each layer which causes an inefficient filtering of the flue gas especially towards the bottom of each layer. In fact, all future carbon beds in the US for new fluid bed incineration plants will probably have a vertical gas flow design from top to bottom having carbon beds stacked up like pancakes with air gap between them. The problem with the horizontal gas flow design is mainly due to non-uniform gas flow distribution, where the carbon beds are installed vertically. The bottom of vertical carbon beds have less gas flow compared to top of carbon beds due to the weight of carbon on top compacting the granule carbon pellets at the bottom. However, as the amount of carbon decreases with the current invention, horizontal flow design should still work.

As shown in FIG. 3-B (APC Carbon Bed Adsorber), there is a schematic of another embodiment of the carbon bed adsorber 102 (e.g., adsorber 102A). In this embodiment, the carbon bed adsorber 102A can be equipped with two layers of sulfur impregnated activated carbon. Layer 1 (from adsorber 102 in FIG. 3-A) has been eliminated from the design due to the installation of HEPA filter 110 upstream of adsorber 102 to capture the dust from flue gas. Flue gas flow is vertical (along the direction of arrow Y) from top to bottom. For each cubic feet of actual gas volume (ACFM) at the adsorber inlet, 4.6 lb of carbon is used in the adsorber (Hazleton). It is to be understood that an advantage of this design is an improved efficiency of the filtering of the flue gas since the layers do not experience any compaction. Furthermore, the filtering efficiency will be higher compared to horizontal gas flow design. Still, the carbon at the bottom will be more compact due to the weight of carbon sitting on top, however the gas flow will be more uniform through the carbon bed compared to horizontal gas flow design. Since there is a HEPA filter installed upstream of adsorber, dust removal activated carbon layer (dummy carbon) is eliminated from the adsorber design resulting in less carbon inside the adsorber and less likely to have a temperature excursion.

Figure 4:
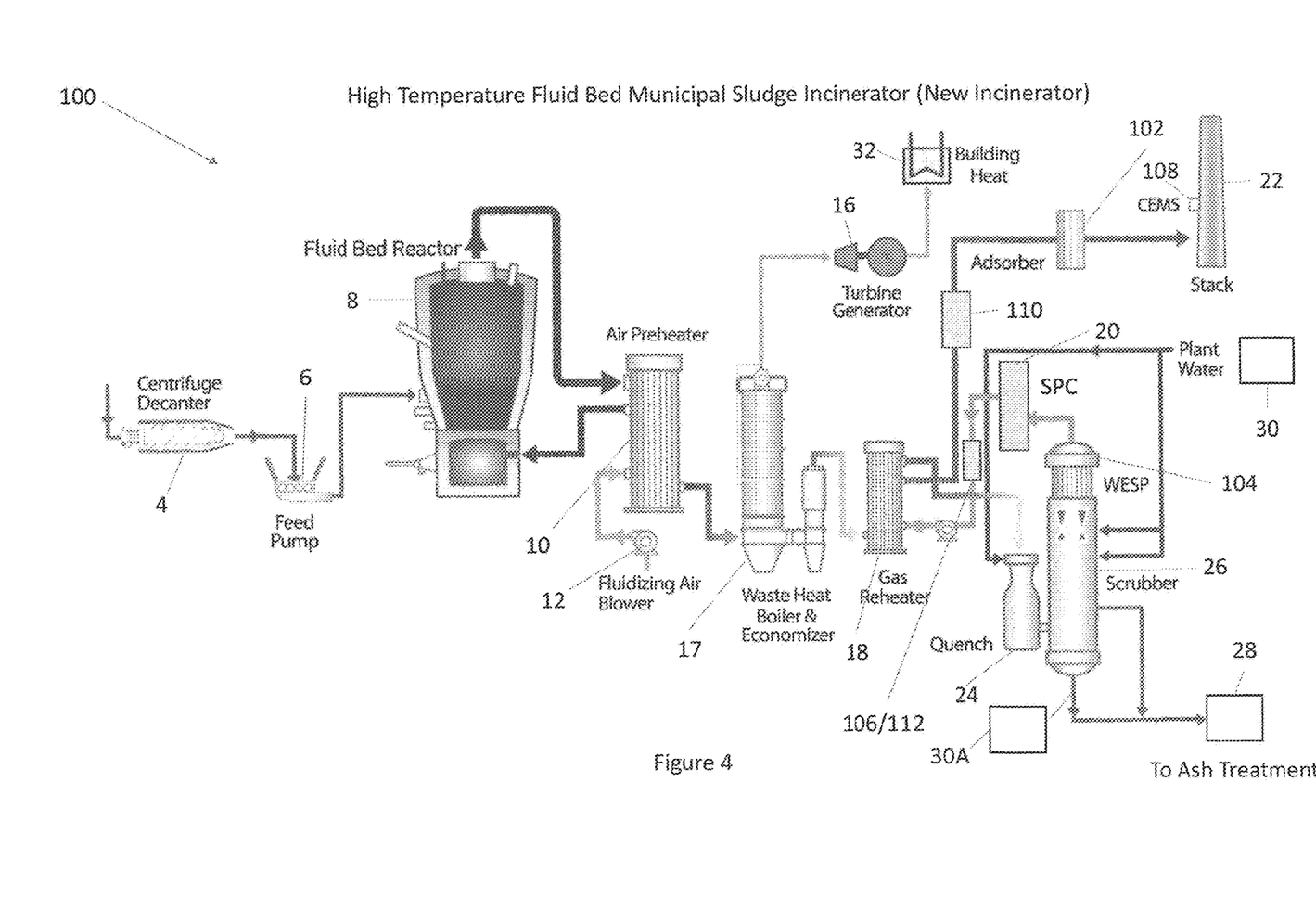
FIG. 4 is a schematic illustration of another embodiment of the high temperature, fluid bed, municipal sludge incineration system, constructed according to the present invention.

FIG. 4 shows another embodiment of a new fluid bed incineration system incorporating SPC module 20 and adsorber 102 into one single design to prevent temperature excursion resulting in carbon bed fires. FIG. 4 shows the SPC module 20 installed after the wet ESP 104. The gas temperature is increased about 1° F. to 3° F. through wet ESP purge air heating system. The SPC module 20 removes the mercury from flue gas. From the SPC module 20, the waste gas flows into a demister 106 to remove free water droplets. In another embodiment, demister 106 might be replaced with a fine particulate filter 112. From demister/fine particulate filter 106/112, waste gas flows through a gas reheater 108 to increase the gas temperature 40° F. to 45° F. From the gas reheater 108, waste gas flows into adsorber 102 for dioxin and furan removal. In another embodiment, a HEPA filter 110 may be installed between the gas reheater 18 and the adsorber 102. In this embodiment, adsorber 102 has only two carbon beds filled with sulfur impregnated activated carbon (an embodiment of adsorber 102, e.g., adsorber 102A in FIG. 3-B). Dust removal layer (302 in adsorber 102 in FIG. 3-A) is eliminated due to the installation of HEPA filter 110.

Figure 5:
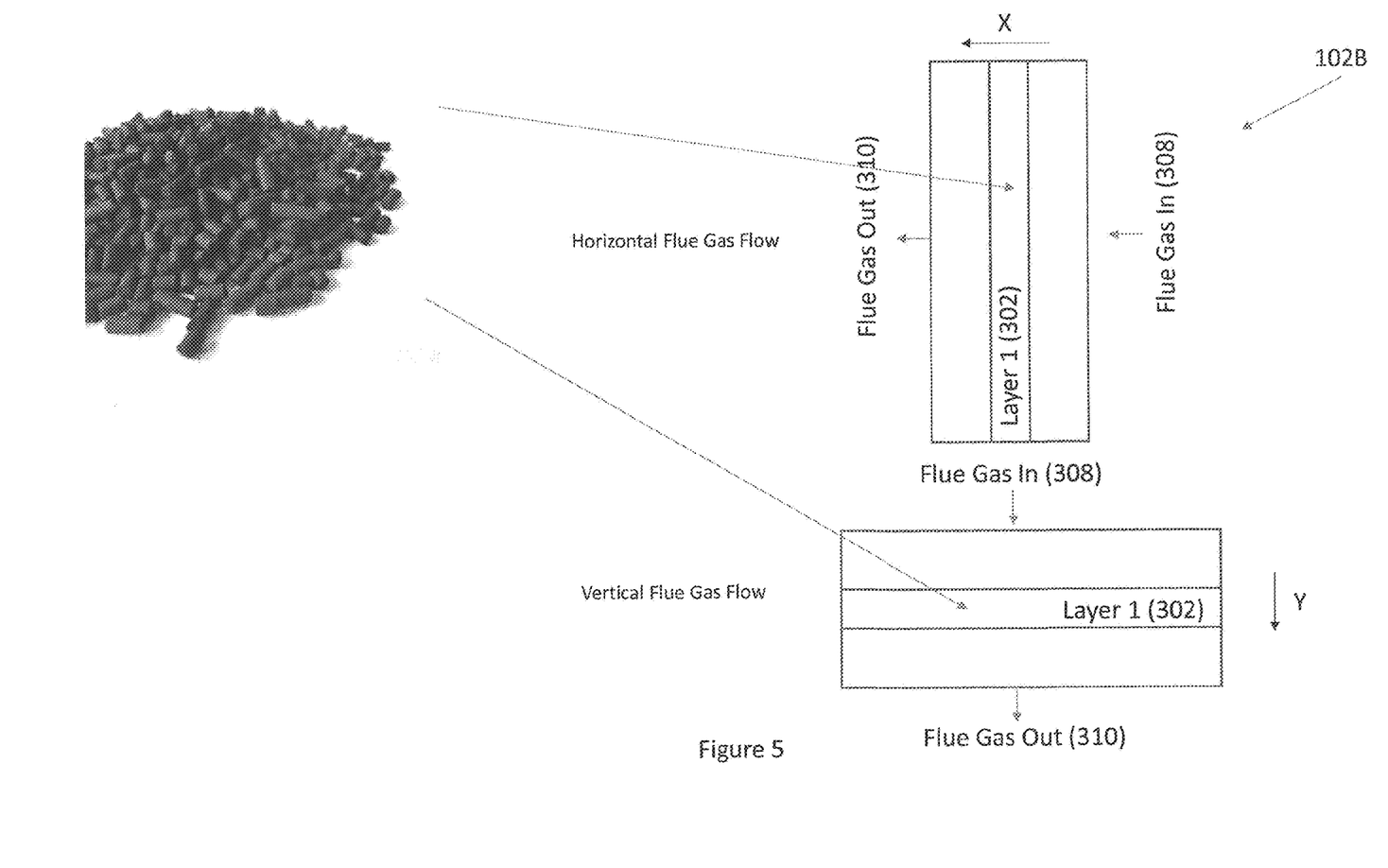
FIG. 5 is a schematic illustration of another embodiment of the adsorber, constructed according to the present invention.

FIG. 5 shows a schematic of another embodiment of adsorber 102 (e.g., adsorber 102B). As shown in FIG. 5, adsorber 102B is constructed with a smaller carbon bed with only one layer 302 of sulfur impregnated activated carbon used in the new fluid bed incineration system incorporating SPC module 20 and adsorber 102B into one single design to prevent carbon bed fires. The adsorber 102B can be designed either horizontal (along the direction of arrow x) or vertical flow (along the direction of arrow Y). The amount of carbon for this design will be between 2 and 3 pounds per one cubic feet of actual gas volume (ACFM) at the adsorber inlet. The advantages of this design include the minimized risk of carbon bed fires due to less carbon bed media and higher heat dissipation from the carbon bed. Since there is only a single carbon bed, heat generated due to exothermic reaction will be easily dissipated away from the bed. Gas flow will be more uniform due to less amount of carbon inside the carbon bed. Regardless of horizontal or vertical gas flow design, the impact of carbon sitting on top part of the bed compacting the bottom part of the bed will be very minimal.

The following tests were carried out during the commissioning of a new high temperature fluid bed municipal sludge incineration plant having only one incinerator with carbon bed adsorber meeting the MACT LLLL emission limits:

As can be seen in the test results above, the amounts of dioxins, furans, and mercury in the clean flue gas were significantly reduced using the high temperature, fluid bed, municipal sludge incineration system 100. Furthermore, other contaminants in the flue gas such as $SO_2$, $NO_x$, CO, HCl, cadmium, lead, and beryllium were also significantly reduced. On top of meeting MACT LLLL emission limits shown as "60 LLLL" in the table, plants also have to meet the local emission requirements per the air permit shown as "Permit" in the table. These are the local emission limits on top of federal emission limits imposed by US EPA MACT LLLL. Every incineration plant is required to have an air permit issued by the state to meet the local and US EPA MACT LLLL emission limits.

The following tests were carried out during the commissioning of two new high temperature fluid bed municipal sludge incineration plants, each plant having one incinerator with one carbon bed adsorber 102 meeting the MACT LLLL emission limits:

TABLE 2

Stack emission test results from two new plants (two incinerators).
NEW INSTALLATION
MACT LLLL TESTS WITH CARBON BED

|  |  | Emission Limit | Plant 1 | Plant 2 |
|---|---|---|---|---|
| Cd | mg/dscm | 0.0011 | <0.000052 | <0.00010 |
| CDD/CDF, TMB | ng/dscm | 0.013 | 0.0125 | 0.016 |
| CDD/CDF, TEQ | ng/dscm | 0.0044 | 0.00034 | 0.0024 |
| CO | ppmvd | 27 | 2.3 | 9 |

TABLE 1

Stack emission test results from a new plant (one incinerator)

| Source | Pollutant | Average Measured | Allowable | Units | % of Allowable | Regulatory basis |
|---|---|---|---|---|---|---|
| FBI Stack 08 | PM, filterable | <0.6 | 9.6 | mg/dscm @ 7% $O_2$ | <6% | 60 LLLL |
|  | PM, filterable + CPM | 0.10 | 0.61 | lb/hour | 17% | Permit |
|  |  | 0.06 | 1.3 | lb/ton of sludge | 4% | Permit |
|  | $PM_{2.5}$, filterable + CPM | 0.10 | 0.55 | lb/hour | 19% | Permit |
|  | $PM_{10}$, filterable + CPM | 0.10 | 0.61 | lb/hour | 17% | Permit |
|  | $SO_2$ | 0.1 | 5.3 | mg/dscm @ 7% $O_2$ | 3% | 60 LLLL |
|  | $NO_x$ | 12 | 30 | mg/dscm @ 7% $O_2$ | 40% | 60 LLLL |
|  | CO | 1.2 | 27 | mg/dscm @ 7% $O_2$ | 4% | 60 LLLL |
|  | HCl | <0.1 | 0.24 | ppm @ 7% $O_2$ | <22% | 60 LLLL |
|  | Dioxins/ Furans | <0.0026 | 0.004 | ng (TEQ)/dscm @ 7% O2 | <58% | 60 LLLL |
|  |  | <0.003 | 0.013 | ng (TMB)/ dscm @ 7% O2 | <20% | 60 LLLL |
|  | Mercury (Hg) | <0.0002 | 0.0010 | mg/dscm @ 7% $O_2$ | 17.3% | 60 LLLL |
|  |  | <0.0001 | 7.1 | lb/24-hour | <0.001% | Permit |
|  | Cadmium (Cd) | <0.00007 | 0.0011 | mg/dscm @ 7% $O_2$ | <6% | 60 LLLL |
|  | Lead (Pb) | 0.00049 | 0.00062 | mg/dscm @ 7% $O_2$ | 79% | 60 LLLL |
|  | Beryllium (Be) | <0.00001 | 7.1 | lb/24-hour | <0.0001% | Permit |
|  | Visual emissions (opacity) | 0.3% | 20% | % | 2% | Permit |

TABLE 2-continued

Stack emission test results from two new plants (two incinerators).
NEW INSTALLATION
MACT LLLL TESTS WITH CARBON BED

|  |  | Emission Limit | Plant 1 | Plant 2 |
|---|---|---|---|---|
| HCl | ppmvd | 0.24 | 0.102 | <0.050 |
| Hg | mg/dscm | 0.001 | 0.00068 | <0.0002 |
| NOx | ppmvd | 30 | 14.4 | 11 |
| Pb | mg/dscm | 0.00062 | 0.00038 | 0.00061 |
| PM | mg/dscm | 9.6 | 0.54 | 4.7 |
| SO2 | ppmvd | 5.3 | 0.15 | 0.28 |

All pollutants corrected to 7% oxygen

New incineration plants must meet either CDD/CDF, TMB or CDD/CDF, TEQ on dioxin and furan emissions to be in compliant with US EPA MACT LLLL emission limits on dioxin and furans. It is to be understood that the plants do not have to meet both TMB and TEQ emissions.

Currently, there are only three new high temperature fluid bed municipal sludge incinerators in the US meeting the US EPA MACT LLLL emission limits. All three new incinerators are operational and meeting the MACT LLLL emission limits through stack emission testing every year. Tables above show the stack emission test results from three new incinerators during commissioning.

The following tests have been carried out during the commissioning of two existing high temperature fluid bed municipal sludge incineration plants, each plant has three high temperature fluid bed municipal sludge incinerators with SPC module 20 meeting the US EPA MACT MMMM emission limits. A total of six incinerators are still in service as of today and meeting the emission limits through testing every year.

TABLE 3

Stack emission test results from two existing plants (six incinerators).
MACT MMMM TESTS WITH SPC MODULES

|  |  | Emission Limit | Plant 1 Inc. No. 1 | Plant 1 Inc. No. 2 | Plant 1 Inc. No. 3 | Plant 2 Inc. No. 1 | Plant 2 Inc. No. 2 | Plant 2 Inc. No. 3 |
|---|---|---|---|---|---|---|---|---|
| Cd | mg/dscm | 0.0016 | <0.00017 | <0.00025 | <0.00030 | <0.00007 | <0.00008 | <0.0001 |
| CDD/CDF, TMB | ng/dscm | 1.2 | — | — | — | 0.02 | 0.239 | 0.08 |
| CDD/CDF, TEQ | ng/dscm | 0.1 | 0.0043 | N/A | 0.0177 | 0.002 | 0.0093 | 0.004 |
| CO | ppmvd | 64 | <1.3 | <2.26 | <1.2 | 2 | 6.9 | <0.4 |
| HCl | ppmvd | 0.51 | <0.1 | <0.18 | <0.091 | <0.03 | <0.02 | <0.02 |
| Hg | mg/dscm | 0.037 | <0.014 | <0.0028 | <0.0065 | 0.0009 | 0.0027 | 0.012 |
| NOx | ppmvd | 150 | 80.2 | 102.4 | 60.6 | 37 | 41 | 18 |
| Pb | mg/dscm | 0.0074 | <0.00029 | 0.00076 | <0.00033 | 0.0026 | 0.00171 | 0.0006 |
| PM | mg/dscm | 18 | 1.104 | <1.03 | 0.83 | 2 | 1.3 | 1.5 |
| SO2 | ppmvd | 15 | 8.1 | <5.92 | 8.5 | 0.2 | 0.104 | <0.1 |

All pollutants corrected to 7% oxygen

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

All of the features disclosed in this specification may be combined in any combination. Thus, unless expressly stated otherwise, each feature disclosed is only an example of a generic series of equivalent or similar features.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other modifications and implementations will occur to those skilled in the art without departing from the spirit and the scope of the invention. Accordingly, the description hereinabove is not intended to limit the invention.

Therefore, provided herein is a new and improved high temperature municipal sludge incinerator, which according to various embodiments of the present invention, offers the following advantages: the ability to remove mercury, dioxin, and furan; the ability to reduce temperature excursions and granule activated carbon bed ("GAC") fires; the use of sorbent polymer composite material to assist in eliminating the temperature excursions and GAC fires; the use of an improved adsorber having smaller carbon bed that includes a smaller amount of activated carbon to also assist in reducing the risk of temperature excursions and fires due to decreased level of exothermic reactions; the use of sorbent polymer composite material to assist in removing the mercury; and the use of a sulfur impregnated activated carbon bed to further assist in removing the mercury.

In fact, in many of the preferred embodiments, these advantages of the ability to remove mercury, dioxin, and furan, the ability to reduce temperature excursions and granule activated carbon bed ("GAC") fires, the use of sorbent polymer composite material to assist in eliminating the temperature excursions and GAC fires, the use of an improved adsorber having smaller carbon bed that includes a smaller amount of activated carbon to also assist in reducing the risk of temperature excursions and fires due to decreased level of exothermic reactions, the use of sorbent polymer composite material to assist in removing the mercury, and the use of a sulfur impregnated activated carbon bed to further assist in removing the mercury are optimized to an extent that is considerably higher than heretofore achieved in prior, known high temperature municipal sludge incinerators.

I claim:

1. A municipal sludge incinerator, comprising:
a centrifuge decanter, wherein the centrifuge decanter is configured to dewater a municipal sludge;
a feed pump operatively connected to the centrifuge decanter, wherein the feed pump is configured to pump the dewatered sludge;
a fluid bed reactor operatively connected to the feed pump, wherein the fluid bed reactor includes a sand bed that is configured to subject the dewatered sludge to a temperature of at least 1250° F. in the sand bed and to produce a flue gas;
an air preheater operatively connected to the fluid bed reactor, wherein the air preheater is configured to cool the flue gas;
a fluidizing air blower operatively connected to the air preheater, wherein the fluidizing air blower is configured to introduce air into the air preheater which interacts with the flue gas to decrease a temperature at which the flue gas exits the air preheater;
a waste heat boiler and economizer operatively connected to the air preheater, wherein the waste heat boiler and economizer is configured to interact with the flue gas that exits the air preheater to remove a portion of ash contained with the flue gas;
a turbine generator operatively connected to the waste heat boiler and economizer, wherein the turbine generator is configured to interact with a steam to create electricity;
a building heat supply operatively connected to the turbine generator, wherein the building heat supply is configured to receive electricity from the turbine generator;
a gas reheater operatively connected to the waste heat boiler and economizer, wherein the gas reheater is configured to lower a temperature of the flue gas;
an adsorber operatively connected to the gas reheater, wherein the adsorber further comprises;
　at least a removable first layer having an amount of activated carbon, wherein the first layer is configured to remove dust from the flue gas,
　a removable second layer located below the first layer and having an amount of sulfur impregnated activated carbon, and
　at least a removable third layer located below the second layer and having an amount of sulfur impregnated activated carbon, wherein the second and third layers are configured to remove mercury, dioxin, and furan from the flue gas;
an exhaust stack operatively connected to the adsorber, wherein the exhaust stack is configured to exhaust the flue gas into the atmosphere;
a quencher operatively connected to the gas reheater, wherein the quencher is configured to reduce a temperature of the flue gas;
a wet electrostatic precipitator operatively connected to the quencher and the gas reheater, wherein the wet electrostatic precipitator is configured to remove particulate matter, cadmium, and lead from the flue gas;
a scrubber operatively connected to the quencher, the wet electrostatic precipitator, and the gas reheater, wherein the scrubber is configured to reduce a temperature of the flue gas and remove particulates from the flue gas;

and
a plant water supply operatively connected to the wet electrostatic precipitator and the scrubber, wherein the plant water supply is configured to supply water to the wet electrostatic precipitator and the scrubber.

2. The municipal sludge incinerator, according to claim 1, wherein the municipal sludge incinerator further comprises:
a demister operatively connected to the wet electrostatic precipitator and the gas reheater, wherein the demister is configured to demist the flue gas to prevent free water droplets from passing through the demister.

3. The municipal sludge incinerator, according to claim 1, wherein the municipal sludge incinerator further comprises:
a HEPA filter operatively connected to the gas reheater and the adsorber, wherein the HEPA filter is configured to capture the dust from flue gas; and
a particulate filter operatively connected to the gas reheater and the wet electrostatic precipitator, wherein the particulate filter is configured to capture and remove free water droplets from the flue gas.

4. The municipal sludge incinerator, according to claim 3, wherein the removable second layer and the at least a removable third layer further comprise:
a weight range of the sulfur impregnated activated carbon for each of the removable second layer and the at least the removable third layer from 4.6 to 6.9 lb. per cubic feet of gas volume at an inlet of the adsorber.

5. The municipal sludge incinerator, according to claim 1, wherein the municipal sludge incinerator further comprises:
a HEPA filter operatively connected to the gas reheater and the adsorber, wherein the HEPA filter is configured to capture the dust from flue gas; and
a sorbent polymer composite (SPC) module operatively connected to the gas reheater and the wet electrostatic precipitator, wherein the SPC module is configured to remove mercury and $SO_2$ from the flue gas.

6. The municipal sludge incinerator, according to claim 5, wherein the municipal sludge incinerator further comprises:
a particulate filter operatively connected to the gas reheater and the sorbent polymer composite (SPC) module, wherein the particulate filter is configured to capture and remove free water droplets from the flue gas.

7. The municipal sludge incinerator, according to claim 5, wherein the removable second layer and the at least a removable third layer further comprise:
a weight range of the sulfur impregnated activated carbon for each of the removable second layer and the at least the removable third layer from 2 to 3 lb. per cubic feet of a gas volume at an inlet of the adsorber.

8. A method of constructing a municipal sludge incinerator, comprising:
providing centrifuge decanter, wherein the centrifuge decanter is configured to dewater a municipal sludge;
attaching a feed pump to the centrifuge decanter, wherein the feed pump is configured to pump the dewatered sludge;
attaching a fluid bed reactor to the feed pump, wherein the fluid bed reactor includes a sand bed that is configured to subject the dewatered sludge to a temperature of at least 1250° F. in the sand bed and to produce a flue gas;
attaching an air preheater to the fluid bed reactor, wherein the air preheater is configured to cool the flue gas;
attaching a fluidizing air blower to the air preheater, wherein the fluidizing air blower is configured to introduce air into the air preheater which interacts with the flue gas to decrease a temperature at which the flue gas exits the air preheater;
attaching a waste heat boiler and economizer to the air preheater, wherein the waste heat boiler and economizer is configured to interact with the flue gas that exits the air preheater to remove a portion of ash contained with the flue gas;
attaching a turbine generator to the waste heat boiler and economizer, wherein the turbine generator is configured to interact with a steam to create electricity;
connecting a building heat supply to the turbine generator, wherein the building heat supply is configured to receive electricity from the turbine generator;
attaching a gas reheater to the waste heat boiler and economizer, wherein the gas reheater is configured to lower a temperature of the flue gas;
attaching an adsorber to the gas reheater, wherein the adsorber further comprises:
at least a removable first layer having an amount of activated carbon, wherein the first layer is configured to remove dust from the flue gas,
a removable second layer located below the first layer and having an amount of sulfur impregnated activated carbon, and
at least a removable third layer located below the second layer and having an amount of sulfur impregnated activated carbon, wherein the second and third layers are configured to remove mercury, dioxin, and furan from the flue gas;
connecting an exhaust stack to the adsorber, wherein the exhaust stack is configured to exhaust the flue gas into the atmosphere;
attaching a quencher to the gas reheater, wherein the quencher is configured to reduce a temperature of the flue gas;
attaching a wet electrostatic precipitator to the quencher and the gas reheater, wherein the wet electrostatic precipitator is configured to remove particulate matter, cadmium, and lead from the flue gas;
attaching a scrubber operatively to the quencher, the wet electrostatic precipitator, and the gas reheater, wherein the scrubber is configured to reduce a temperature of the flue gas and remove particulates from the flue gas; and
connecting a plant water supply to the wet electrostatic precipitator and the scrubber, wherein the plant water supply is configured to supply water to the wet electrostatic precipitator and the scrubber.

9. The method, according to claim 8, wherein the method further comprises:
attaching a demister to the wet electrostatic precipitator and the gas reheater, wherein the demister is configured to demist the flue gas to prevent free water droplets from passing through the demister.

10. The method, according to claim 8, wherein the method further comprises:
attaching a HEPA filter to the gas reheater and the adsorber, wherein the HEPA filter is configured to capture the dust from flue gas; and
attaching a particulate filter to the gas reheater and the wet electrostatic precipitator, wherein the particulate filter is configured to capture and remove free water droplets from the flue gas.

11. The method, according to claim 10, wherein the removable second layer and the at least a removable third layer further comprise:

a weight range of the sulfur impregnated activated carbon for each of the removable second layer and the at least a removable third layer from 4.6 to 6.9 lb. per cubic feet of gas volume at an inlet of the adsorber.

12. The method, according to claim 8, wherein the method further comprises:
attaching a HEPA filter to the gas reheater and the adsorber, wherein the HEPA filter is configured to capture the dust from flue gas; and
attaching a sorbent polymer composite (SPC) module to the gas reheater and the wet electrostatic precipitator, wherein the SPC module is configured to remove mercury and $SO_2$ from the flue gas.

13. The method, according to claim 12, wherein the method further comprises:
attaching a particulate filter to the gas reheater and the sorbent polymer composite (SPC) module, wherein the particulate filter is configured to capture and remove free water droplets from the flue gas.

14. The method, according to claim 12, wherein the removable second layer and the at least a removable third layer further comprise:
a weight range of the sulfur impregnated activated carbon for each of the removable second layer and the at least a removable third layer from 2 to 3 lb. per cubic feet of a gas volume at an inlet of the adsorber.

15. A method of using a municipal sludge incinerator, comprising:
dewatering sludge by a centrifuge decanter;
conveying the dewatered sludge by a feed pump from the centrifuge decanter to a fluid bed reactor having a sand bed;
heating the dewatered sludge in the sand bed of the fluid bed reactor to a temperature of least 1250° F. to produce a flue gas
transporting the flue gas to an air preheater, wherein the air preheater is configured to cool the flue gas;
introducing air into the air preheater by a fluidizing air blower to decrease a temperature at which a waste flue gas exits the air preheater;
heating the air by the flue gas in the air preheater;
transporting the flue gas and the heated air to a waste heat boiler and economizer;
removing a portion of ash contained in the flue gas by the waste heat boiler and economizer;
transporting a portion of the flue gas to a turbine generator to create electricity and provide a building heat supply, wherein the building heat supply is configured to receive electricity from the turbine generator;
transporting a remainder of the flue gas to a gas reheater;
introducing clean flue gas into the gas reheater;
interacting the clean flue gas with the remainder of the flue gas;
increasing a temperature of the clean flue gas and decreasing the temperature of the waste flue gas that is discharged from the air preheater;
transporting the waste flue gas to a quencher and a scrubber;
removing particulates and acid gas from the remainder of the flue gas;
transporting the remainder of the flue gas back to the gas reheater to reheat the remainder of the flue gas;
transporting the clean flue gas to an adsorber, wherein the adsorber further comprises;
at least a removable first layer having an amount of activated carbon, wherein the first layer is configured to remove dust from the flue gas,
a removable second layer located below the first layer and having an amount of sulfur impregnated activated carbon, and
at least a removable third layer located below the second layer and having an amount of sulfur impregnated activated carbon, wherein the second and third layers are configured to remove mercury, dioxin, and furan from the flue gas;
transporting the remainder of the flue gas to an exhaust stack;
monitoring for oxygen, carbon monoxide and nitrogen oxide in the remainder of the flue gas in the exhaust stack; and
exhausting the remainder of the flue gas into the atmosphere.

16. The method, according to claim 15, wherein the method further comprises:
transporting the remainder of the flue gas from the quencher and the scrubber to a demister;
demisting the remainder of the flue gas to prevent free water droplets from passing through the demister; and
transporting the demisted flue gas to the gas reheater.

17. The method, according to claim 15, wherein the method further comprises:
transporting the remainder of the flue gas from the quencher and a scrubber to a particulate filter;
removing particulates and water droplets from the remainder of the flue gas through the use of the particulate filter;
transporting the remainder of the flue gas to the gas reheater;
transporting the remainder of the flue gas to HEPA filter;
remove dust from the remainder of the flue gas through the use of the HEPA filter; and
transporting the remainder of the flue gas to the adsorber.

18. The method, according to claim 17, wherein the removable second layer and the at least a removable third layer further comprise:
a weight range of the sulfur impregnated activated carbon for each of the removable second layer and the at least a removable third layer from 4.6 to 6.9 lb. per cubic feet of gas volume at an inlet of the adsorber.

19. The method, according to claim 15, wherein the method further comprises:
transporting the remainder of the flue gas from the quencher and a scrubber to a sorbent polymer composite (SPC) module;
removing mercury from the remainder of the flue gas through the use of the sorbent polymer composite (SPC) module;
transporting the remainder of the flue gas to the gas reheater;
transporting the remainder of the flue gas to HEPA filter;
removing dust from the remainder of the flue gas through the use of the HEPA filter; and
transporting the remainder of the flue gas to the adsorber.

20. The method, according to claim 19, wherein the removable second layer and the at least a removable third layer further comprise:
a weight range of the sulfur impregnated activated carbon for each of the removable second layer and the at least a removable third layer from 2 to 3 lb. per cubic feet of a gas volume at an inlet of the adsorber.

* * * * *